US005976679A

United States Patent [19]

Tomono et al.

[11] Patent Number: 5,976,679

[45] Date of Patent: Nov. 2, 1999

[54] HIGH-FREQUENCY CIRCUIT ELEMENT

[75] Inventors: Kunisaburo Tomono, Otsu; Hiroshi Marusawa, Moriyama, both of Japan

[73] Assignee: Murata Manufacturing Co., Ltd., Japan

[21] Appl. No.: 08/794,468

[22] Filed: Feb. 4, 1997

[30] Foreign Application Priority Data

Feb. 6, 1996 [JP] Japan .................................... 8-020164

[51] Int. Cl.[6] .............................. B32B 15/16; H01P 1/36; H01P 1/38

[52] U.S. Cl. .......................... 428/209; 428/469; 428/693; 428/900

[58] Field of Search .................................... 333/1.1, 24.2; 335/306; 428/670, 548, 681, 682, 611, 928, 900, 693, 701, 469, 472, 471, 209

[56] References Cited

U.S. PATENT DOCUMENTS

| | | | |
|---|---|---|---|
| 4,992,338 | 2/1991 | Hartwar et al. | 428/694 |
| 5,379,004 | 1/1995 | Marusawa et al. | 333/1.1 |
| 5,498,999 | 3/1996 | Marusawa et al. | 333/1.1 |
| 5,611,878 | 3/1997 | Miura et al. | 156/89 |
| 5,709,811 | 1/1998 | Satoh et al. | 252/62.57 |
| 5,774,024 | 6/1998 | Marusawa et al. | 333/1.1 |

FOREIGN PATENT DOCUMENTS

| | | |
|---|---|---|
| 359413 | 3/1990 | European Pat. Off. . |
| 976102 | 2/1962 | United Kingdom . |
| 2269942 | 2/1994 | United Kingdom . |

OTHER PUBLICATIONS

T.K. Hatwar, et al., "Control of exchange coupling for direct overwrite media using Pd metal Interlayer", *Journal of Applied Physics*, Nov. 15, 1991, No. 10, Pt. II, New York, US, pp. 6439–6441.

*Primary Examiner*—John J. Zimmerman
*Attorney, Agent, or Firm*—Ostrolenk, Faber, Gerb & Soffen, LLP

[57] ABSTRACT

A high-frequency circuit element which can be formed by firing simultaneously a microwave magnetic body and a hard magnetic body plate in the form of a laminate. The microwave magnetic body is made of calcium-vadium-iron and the hard magnetic body plate is made of strontium-iron, so that they have approximately the same firing temperature. They are separated by a screening film of palladium or platinum, which prevents the diffusion of strontium ions from the hard magnetic body plate to the microwave magnetic body. This constitution permits the simultaneous firing of the two components. The high-frequency circuit element is useful as a small, high-precision circulator, isolator, or inductor.

15 Claims, 4 Drawing Sheets

HIGH-FREQUENCY CIRCUIT ELEMENT

BACKGROUND OF THE INVENTION

1. Field of the Invention

The present invention relates to a high-frequency circuit element for the microwave band and, more particularly, to a high-frequency element for use in a circulator, isolator, or inductor, for example.

2. Description of the Prior Art

There has been an increasing demand for size reduction and thickness reduction of high-frequency circuit elements as circulators, isolators, and inductors. In compliance with this demand, the inventors of the present application disclosed a new method for producing a high-frequency circuit element in Laid-open Japanese Patent Application No. 6-61708. This method consists of printing a transmission wire on the surface of a microwave magnetic substrate, laminating a plurality of the substrates by pressing, and firing the laminate. This method permits the production of small, thin high-frequency circuit elements and also permits the accurate alignment of substrates. A high-frequency circuit element produced by this method has the structure as shown in FIG. 3.

The high-frequency circuit element 20 shown in FIG. 3 is composed of a microwave magnetic substrate 1*a*, three pieces of microwave magnetic substrate 1*b* each having a transmission wire 2 formed on its principal surface, and two pieces of hard magnetic substrate 3, all the substrates being laminated one over another. The high-frequency circuit element 20 is used as an isolator or circulator in the microwave band.

The high-frequency circuit element 20 is produced by the process explained below with reference to FIG. 4. First, an yttrium-iron powder is prepared as a starting material for the microwave magnetic body. This powder is mixed with an organic solvent, binder, dispersing agent, and plasticizer to give a slurry. This slurry is formed into a strip of green sheet (10–200 μm thick) by the doctor blade method. Green sheets for substrate la and the substrate 1*b* are formed separately. The green sheet for substrate 1*a* is cut into several pieces, each serving as green sheet 1*a*' for the microwave magnetic body. (Green sheet 1*a*' becomes substrate la upon firing.) The green sheet for substrates 1*b* has its principal surface printed with a conductive paste to form a transmission line 2 thereon. The green sheet is cut into several pieces, each serving as green sheet 1b' for the microwave magnetic body. (Green sheet 1*b*' becomes substrate 1*b* upon firing.) Desired pieces of green sheet 1*a*' and green sheet 1*b*' are laminated one over another under pressure, and the laminate is fired to obtain a sintered body (not shown) consisting of several pieces of substrate 1*a* and substrate 1*b*.

Secondly, a strontium-iron powder is prepared as a starting material for the hard magnetic body plate 3. This powder is mixed with an organic solvent, binder, dispersing agent, and plasticizer to give a molding material. This molding material is formed into a strip of green sheet 3' (10–200 μm thick) by extrusion. The green sheet is cut to a prescribed size and then fired to give the hard magnetic body plate 3.

Thirdly, the laminate sintered body consisting of several pieces of substrate la and substrate 1*b* is sandwiched between two pieces of hard magnetic body plate 3. The entire assembly is enclosed in a casing (not shown). Finally, the hard magnetic body plate 3 is magnetized. In this way the high-frequency circuit element 20 is obtained.

The disadvantage of the conventional method for producing the high-frequency circuit element 20 is difficulties in firing simultaneously the green sheets 1*a*' and 1*b*' of microwave magnetic body and the green sheet of high magnetic body plate 3. This is due to the fact that the firing temperature of the yttrium-iron-containing substrates 1*a* and 1*b* is about 1500° C., whereas that of the strontium-iron-containing hard magnetic body plate 3 is 1250° C. This makes it necessary to perform firing separately on the laminate of green sheets 1*a*' and 1*b*' and the green sheets of the hard magnetic body plate 3 and to join the sintered bodies together afterward by an appropriate method. The joining is liable to cause a misalignment of the sintered bodies in the individual high-frequency circuit element. Another disadvantage is that when the laminate of green sheets 1*a*' , 1*b*' , and 3' formed by pressing is fired at, say, 1500° C., firing causes the strontium ions contained in the hard magnetic body plate 3 to diffuse into the substrates 1*a* and 1*b*, thereby greatly deteriorating the electric properties of the high-frequency circuit element.

SUMMARY OF THE INVENTION

The present invention was completed to address the above-mentioned problems. It is an advantage of the present invention to provide a high-frequency circuit element which is characterized in that the microwave magnetic body for substrates 1*a* and 1*b* is made from calcium-vanadium-iron and the hard magnetic body 3 is made from strontium-iron, with the substrates 1*a* and 1*b* and the hard magnetic body 3 being separated by a screening film 4 of a platinum group metal such as platinum or palladium. The present invention offers the advantage that a laminate formed by pressing together the green sheets of the microwave magnetic body and the green sheets of the hard magnetic body can be fired in one step to give the high-frequency circuit element because there is no great difference in firing temperature between the microwave magnetic body of calcium-vanadium-iron and the hard magnetic body of strontium-iron. An additional advantage is that the screening film 4 prevents the diffusion of strontium ions.

A further advantage of the present invention is to provide a high-frequency circuit element which is composed of microwave magnetic bodies laminated one over another, each microwave magnetic body having a transmission wire formed on its principal surface, and the laminate having a hard magnetic body plate attached to at least one surface thereof, and characterized in that the laminate of microwave magnetic bodies and the hard magnetic body plate are separated by a screening film of platinum group metal.

It is another advantage of the present invention to provide a process for producing the high-frequency circuit element. This process comprises the steps of making a microwave magnetic body into green sheets, each having a transmission wire formed on its principal surface, laminating the green sheets one over another, attaching a green sheet of hard magnetic body to at least one surface of the laminate, with a screening film of platinum group metal interposed between them, and finally firing them all at once to integrate them.

DESCRIPTION OF AN EMBODIMENT OF THE INVENTION

Figure 1:
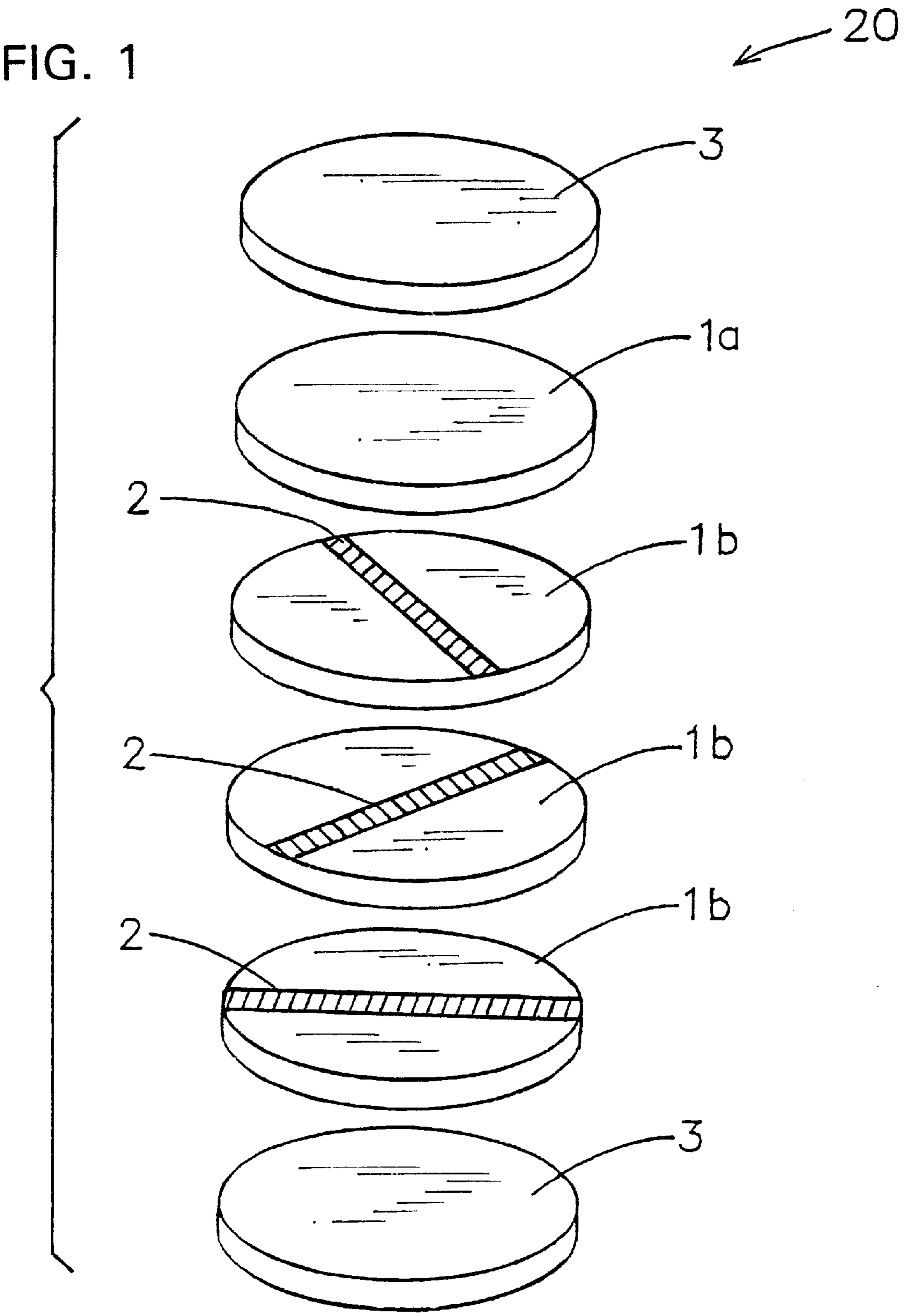
FIG. 1 is an exploded perspective view of a high-frequency circuit element pertaining to the present invention.

An embodiment of the present invention will be described with reference to FIGS. 1 and 2, in which like reference characters are used for corresponding parts in the conventional product (and hence their explanation is omitted).

Figure 2:
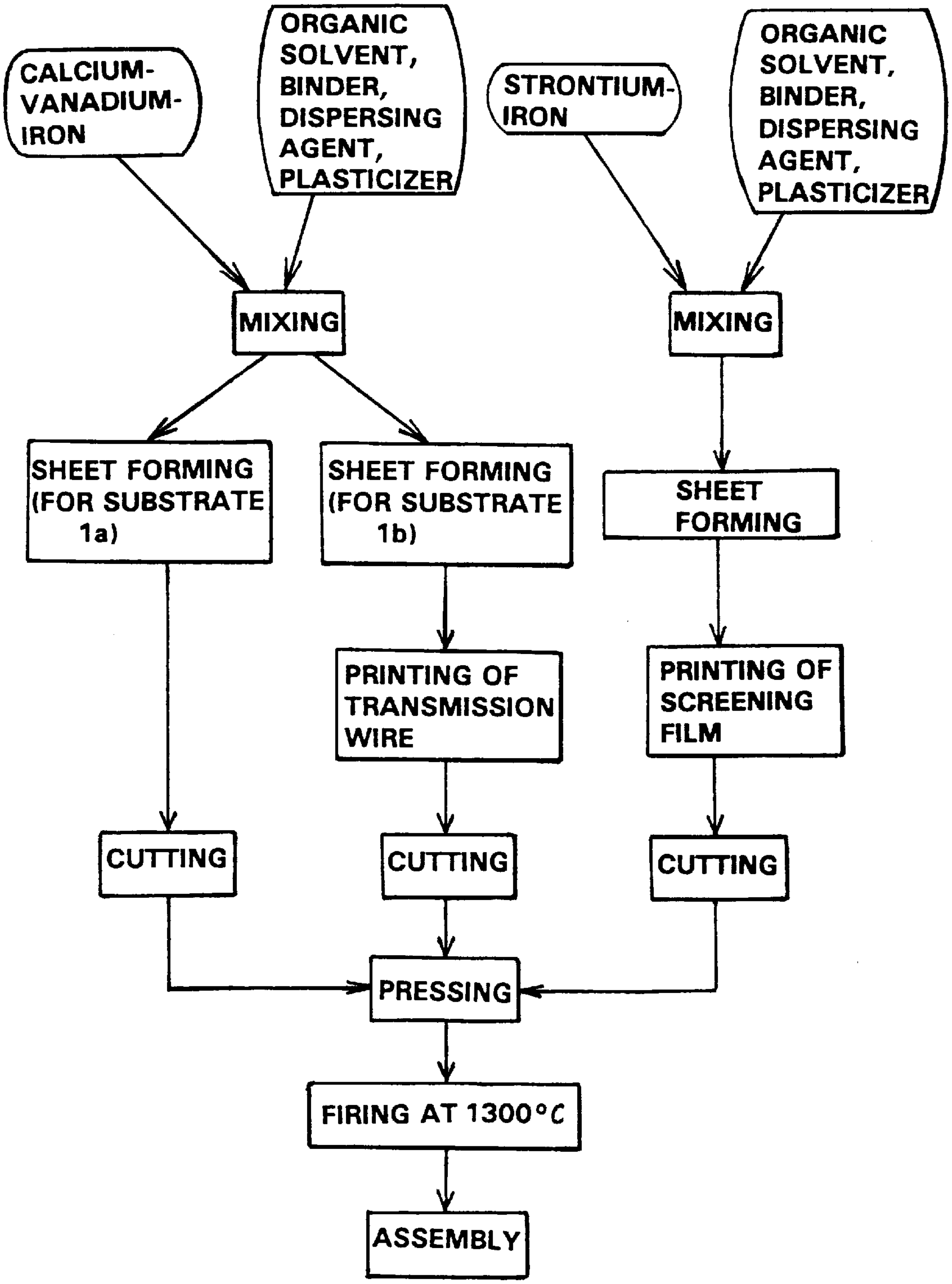
FIG. 2 is a flow chart showing a process for producing a high-frequency circuit element pertaining to the present invention.
Figure 3:
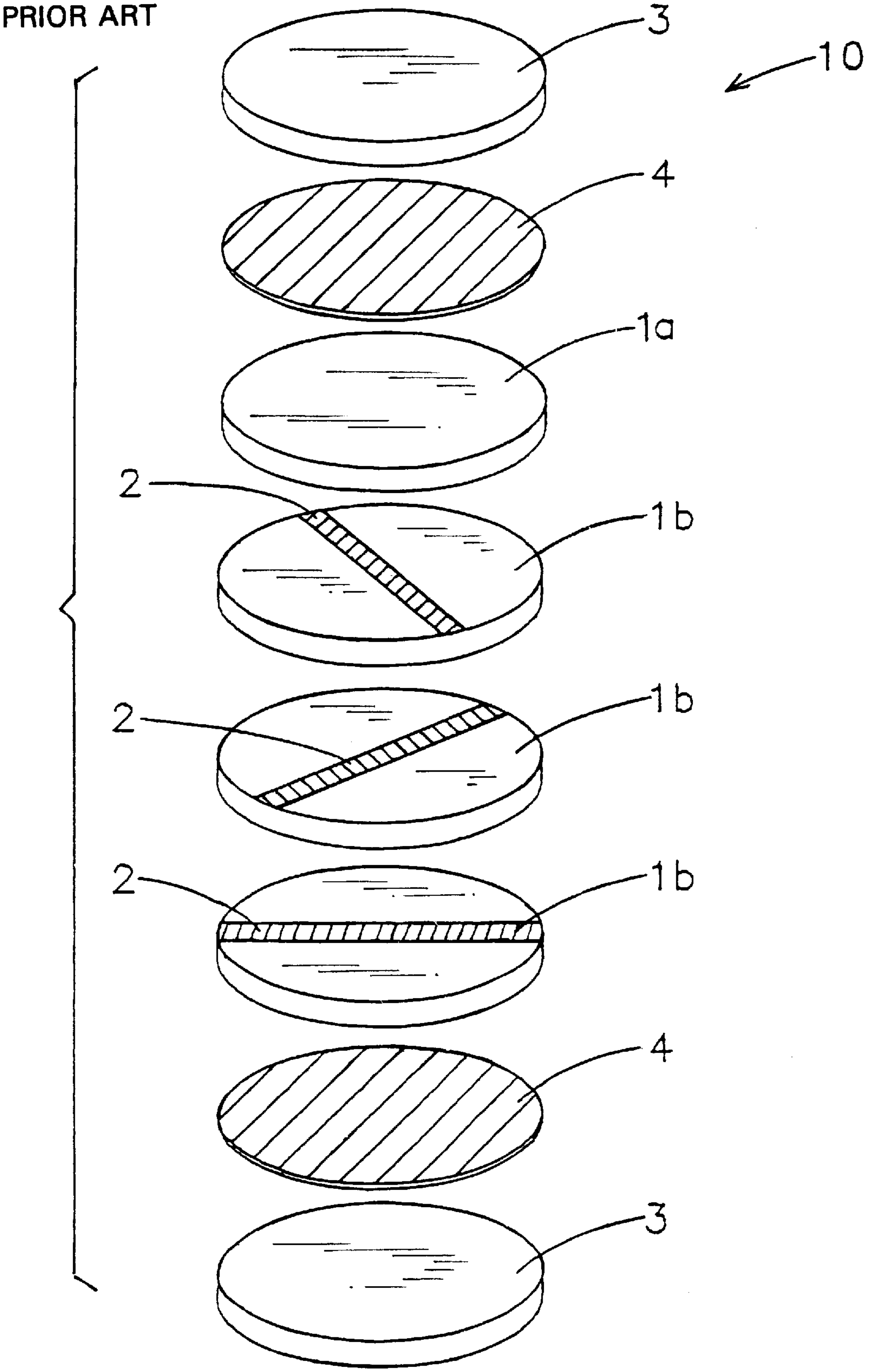
FIG. 3 PRIOR ART
FIG. 3 is an exploded perspective view of a conventional high-frequency circuit element.
Figure 4:
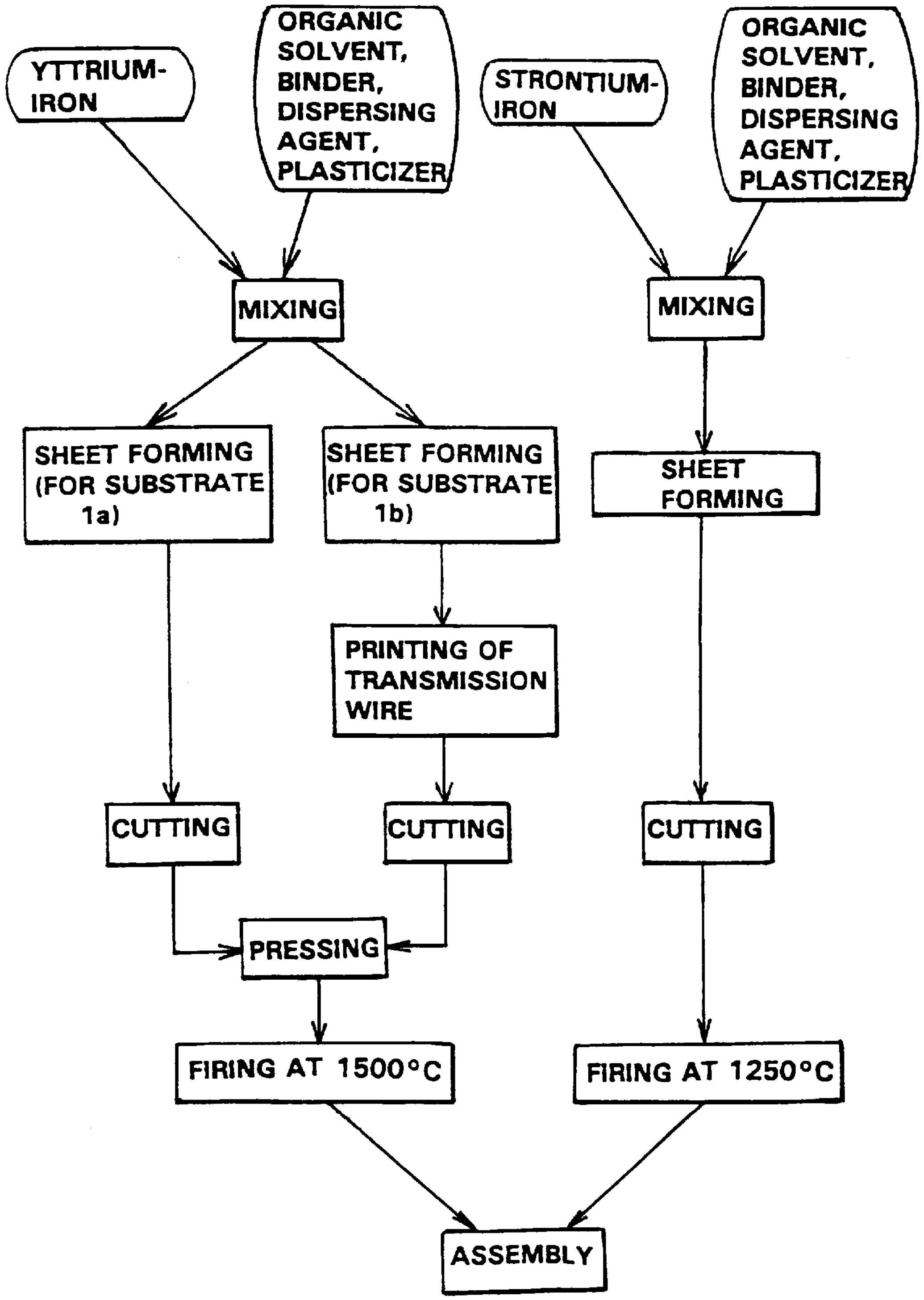
FIG. 4 PRIOR ART
FIG. 4 is a flow chart showing a process for producing a conventional high-frequency circuit element.

In FIG. 1, there is shown the high-frequency circuit element 10 according to an embodiment of the present invention. It is composed of microwave magnetic substrates 1*a* and 1*b* which are laminated one over another. Each microwave magnetic substrate 1*b* has a transmission wire 2 formed on its surface. The laminate of the microwave magnetic substrates is sandwiched by hard magnetic body plates 3. Between the microwave magnetic substrate and the hard magnetic body plate 3 is interposed a screening film 4 of palladium. This high-frequency circuit element 10 is used as a circulator or an isolator in the microwave band.

This high-frequency circuit element 10 can be produced by a process which is explained below with reference to FIG. 2. A calcium-vanadium-iron powder is prepared as a raw material for the microwave magnetic body. This powder is mixed with an organic solvent, binder, dispersing agent, and plasticizer to give a molding material. By using the doctor blade method, the molding material is made into a strip of green sheet (10–200 μm thick) for the substrates 1*a* and 1*b*. The green sheet for the substrates 1*b* has a transmission wire 2 formed on its principal surface by printing with a conductive paste composed mainly of palladium.

Similarly, a strontium-iron powder is prepared as a raw material for the hard magnetic body plate. This powder is mixed with an organic solvent, binder, dispersing agent, and plasticizer to give a molding material. By using the extrusion molding method, the molding material is made into a strip of green sheet (10–200 μm thick) for the hard magnetic body plate 3. The hard magnetic body plate 3 has one surface entirely coated with a conductive paste (composed mainly of palladium) by printing. This coating becomes the screening film 4 upon firing.

The green sheets (in the form of strips) for the substrates 1*a* and 1*b* and the hard magnetic body plate 3 are cut to prescribed sizes and shapes. As many cut green sheets as are necessary for substrates 1*a* and 1*b* are laminated under pressure. The resulting laminate is sandwiched under pressure between two pieces of the green sheet for the hard magnetic body plate 3, with the printed coatings of conductive paste composed mainly of palladium on the two pieces of green sheet facing the upper and lower surfaces of the laminate. The laminate of green sheets is degreased and fired at 1300° C.

After firing, the sintered hard magnetic body plates 3 are magnetized. In this way there is obtained the high-frequency circuit element 10 which operates as an isolator, for example, in the microwave band.

The above-mentioned embodiment, in which the palladium conductive paste (which becomes the screening film 4) is applied to the green sheet for the hard magnetic body plate 3, may be modified such that the palladium conductive paste is applied instead to the top and bottom green sheets for the substrates 1*a* and 1*b*.

Although the high-frequency circuit element in the above-mentioned embodiment has three pieces of substrate 1*b*, only one substrate 1*b* may suffice. (In other words, the element may be constructed of one piece of substrate 1*a* and one piece of substrate 1*b*, which are laminated one over the other, and two pieces of hard magnetic body plate 3, which are placed on both sides of the laminate, with the screening film 4 interposed between them.) The high-frequency circuit element in this structure can be used as an inductor in the high-frequency band because a DC magnetic field due to the hard magnetic body plate 3 is applied to the transmission wire 2.

According to the present embodiment, the high-frequency circuit element is characterized in that the substrates for the microwave magnetic body contain calcium-vanadium-iron and the hard magnetic body plates contain strontium-iron. The fact that both calcium-vanadium-iron and strontium-iron have the same sintering temperature (1250–1350° C.) makes it possible to fire the substrates for the microwave magnetic body and the hard magnetic body plates simultaneously. In addition, the screening film of platinum group metal, which is interposed between the substrates for the microwave magnetic body and the hard magnetic body plates, prevents the diffusion of ions from the hard magnetic body plate to the substrates for the microwave magnetic body during sintering.

In the case where the substrates for the microwave magnetic body and the hard magnetic body plates are simply laminated and fired without the screening film, the substrates for the microwave magnetic body and the hard magnetic body plates deteriorate in magnetic properties due to the diffusion of ions contained in the hard magnetic body plates. This deterioration is known by the fact that the half band width (ΔH) of ferromagnetic resonance decreases from 19.0 to 45.0 and the dielectric loss increases from $1.5\times10^{-4}$ to $25.5\times10^{-4}$ in the case where the substrates for the microwave magnetic body are of calcium-vanadium-iron and that the coercive force ($iH_c$) decreases from $3.0\times10^{3}$ to $1.0\times10^{3}$ and the residual magnetic flux density ($B_r$) decreases from $3.5\times10^{3}$ to $1.5\times10^{3}$ in the case where the hard magnetic body plates are of strontium-iron. However, this is not the case in the present invention because the diffusion of ions is prevented by the screening film. In other words, according to the present invention, it is possible to fire the substrates for the microwave magnetic body and the hard magnetic body plates simultaneously in the form of a laminate without deteriorating their electric and magnetic properties.

The high-frequency circuit element in the foregoing embodiment is characterized in that microwave magnetic bodies and hard magnetic body plates are laminated, with a palladium screening film interposed between them so as to prevent the diffusion of strontium ions from the former to the latter. However, the embodiment may be modified such that the screening film may be made of any platinum group metal, alone or in combination (such as platinum, rhodium, palladium-platinum alloy, and platinum-rhodium alloy), so long as the screening film prevents the constituent atoms of the hard magnetic body plates from diffusing into the microwave magnetic bodies at temperatures high enough for the solid-phase reaction.

In addition, although the high-frequency circuit element in the foregoing embodiment is composed of microwave magnetic bodies of calcium-vanadium-iron and hard magnetic body plates of strontium-iron, the embodiment may be modified by making the hard magnetic body plate of magnetoplumbite-type ferrite composed of barium, strontium, calcium, and lead, so long as it has approximately the same firing temperature as the microwave magnetic body. It is known that the firing temperature of these materials ranges from 1200° C. to 1300° C.

What is claimed is:

1. A circuit element comprising:

a first magnetic body;

a hard magnetic body attached to said first magnetic body;

a film of platinum group metal interposed between said first magnetic body and said hard magnetic body, wherein said magnetic body contains calcium-vanadium-iron and said hard magnetic body contains strontium-iron.

2. A circuit element according to claim 1, further comprising:

a conductor associated with said first magnetic body.

3. A circuit element according to claim 2, wherein said first magnetic body is a laminate of a plurality of sheets and said conductor is formed on one of said plurality of sheets.

4. A circuit element according to claim 1, wherein said first magnetic body and said hard magnetic body consist essentially of ceramic materials with a common sintering temperature.

5. A circuit element according to claim 4, wherein said common sintering temperature is about 1250–1350 degrees C.

6. A circuit element according to claim 4, wherein said platinum group metal film comprises a metal which prevents migration of ions between said first magnetic body and said hard magnetic body upon sintering of said magnetic bodies.

7. A circuit element according to claim 1, wherein said platinum group metal film comprises a metal which prevents migration of ions between said first magnetic body and said hard magnetic body upon sintering of said magnetic bodies.

8. A circuit element according to claim 1, wherein the film of platinum group metal is co-extensive with the interface of the first magnetic body and the hard magnetic body.

9. A circuit element comprising:

a first magnetic body;

a hard magnetic body attached to said first magnetic body;

a film of platinum group metal interposed between said first magnetic body and said hard magnetic body, wherein said platinum group metal film comprises a metal which prevents migration of ions between said first magnetic body and said hard magnetic body upon sintering of said magnetic body and said platinum group metal film is disposed so as to prevent migration of metal ions between the bodies.

10. A circuit element according to claim 9, wherein said magnetic body contains calcium-vanadium-iron and said hard magnetic body contains strontium-iron.

11. A circuit element according to claim 9, further comprising:

a conductor associated with said first magnetic body.

12. A circuit element according to claim 11, wherein said first magnetic body is a laminate of a plurality of sheets and said conductor is formed on one of said plurality of sheets.

13. A circuit element according to claim 9, wherein said first magnetic body and said hard magnetic body consist essentially of ceramic materials with a common sintering temperature.

14. A circuit element according to claim 13, wherein said magnetic body contains calcium-vanadium-iron and said hard magnetic body contains strontium-iron and said common sintering temperature is about 1250–1350 degrees C.

15. A circuit element according to claim 9, wherein the film of platinum group metal is co-extensive with the interface of the first magnetic body and the hard magnetic body.

* * * * *